March 22, 1938. G. R. KILGORE 2,112,029
DETECTOR AND DETECTOR CIRCUITS FOR ULTRASHORT WAVES
Filed Oct. 27, 1934 2 Sheets-Sheet 1
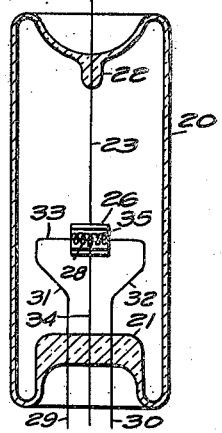
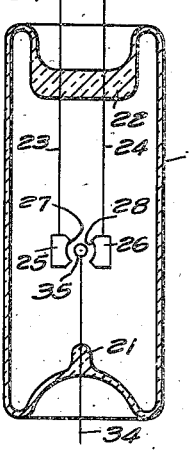
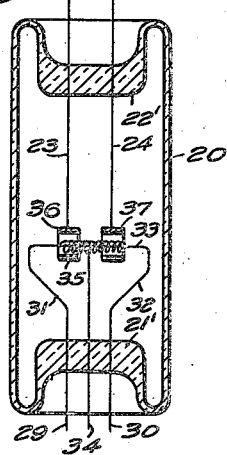
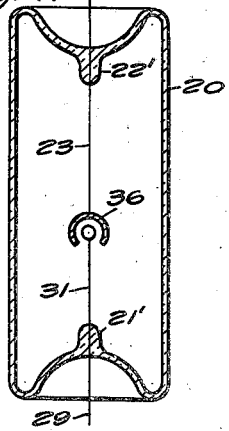
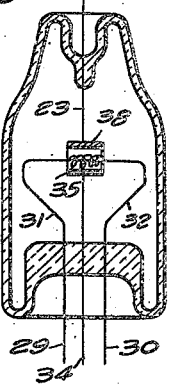
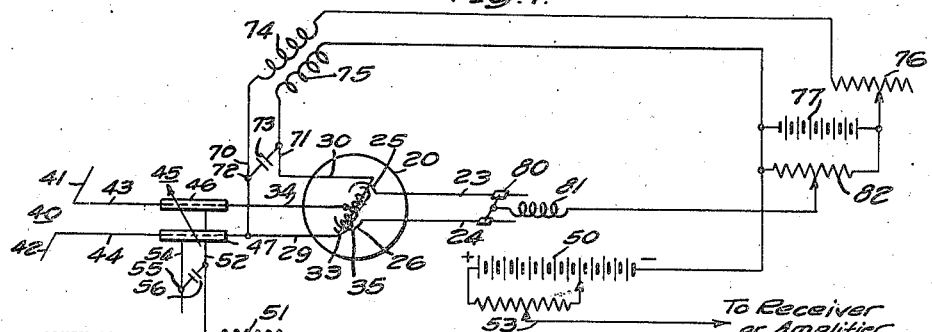
WITNESSES:
E. A. McCloskey
R. W. Bailey
INVENTOR
George R. Kilgore.
BY
F. W. Lyle
ATTORNEY

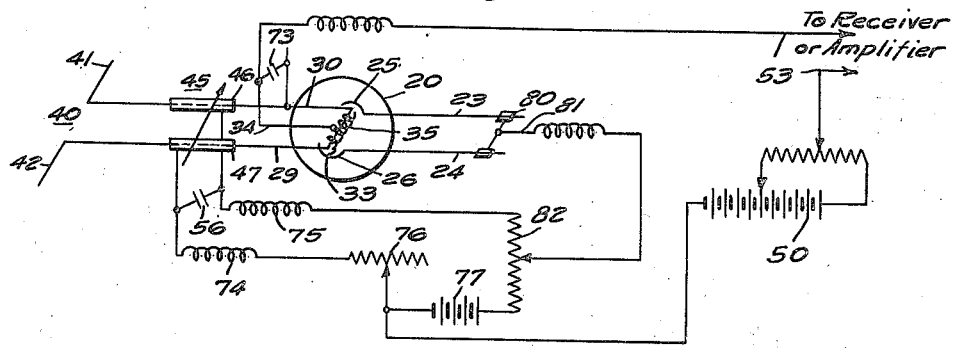
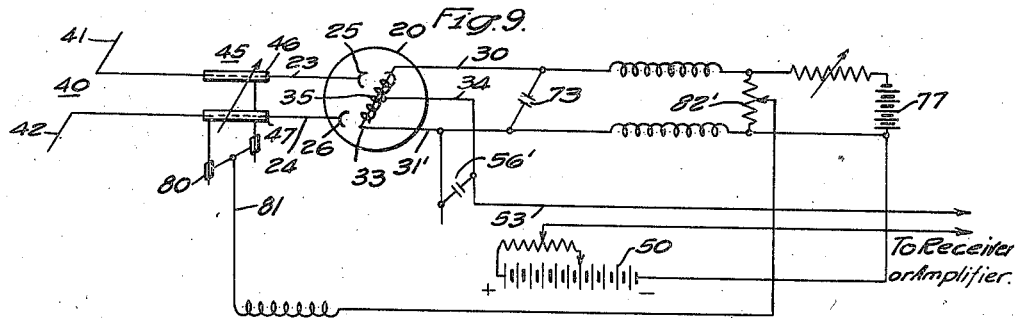
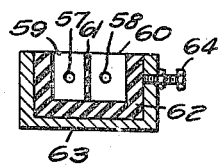 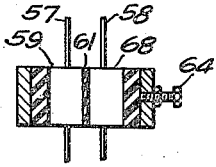 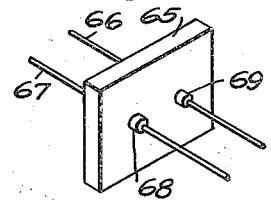

Patented Mar. 22, 1938

2,112,029

UNITED STATES PATENT OFFICE 2,112,029

DETECTOR AND DETECTOR CIRCUITS FOR ULTRASHORT WAVES

George R. Kilgore, Bloomfield, N. J., assignor to Westinghouse Electric & Manufacturing Company, East Pittsburgh, Pa., a corporation of Pennsylvania Application October 27, 1934, Serial No. 750,305

8 Claims. (Cl. 250—27)

My invention relates to detectors and detector circuits for ultra short waves and especially to detector and detector circuits for ultra short radio waves of the order of 10 centimeters or less.

An object of my invention is to provide a detector and a detector circuit for radio waves of the order of 100 centimeters or less where it has been found that the conventional tube detectors used for longer waves cannot be used with these very short waves.

Another object of my invention is to apply the direct current potential to the electrodes in the manner that the normal radio frequency distribution in the input circuit is not disturbed.

Another object of my invention is to provide means for reflecting back the incoming signal from the portion of the detector circuit containing the direct current source.

It is a special object of my invention to provide a detector and detector circuit for use with the magnetostatic oscillators described in Patent No. 2,064,012, dated December 12, 1936 and for the oscillators described in my Patent No. 2,046,688, dated July 7, 1936, Serial No. 718,280, filed March 30, 1934.

Other objects of my invention will become evident from the following detailed description taken in conjunction with the accompanying drawings, in which—

Figures 1 and 2 are, respectively, front and side sectional views of a detector constructed in accordance with my invention.

Figs. 3 and 4 are, respectively, front and side sectional views of a modification of the detector in Figs. 1 and 2.

Figs. 5 and 6 are front and side sectional views of a still further modification of the detectors disclosed in Figs. 1 through 4.

Fig. 7 is a diagram illustrating a preferred detector circuit arranged according to my invention.

Fig. 8 is a diagram of a circuit which is a modification of that disclosed in Fig. 7.

Fig. 9 is a diagram of a still further modification of the circuit disclosed in Fig. 7.

Figs. 10 and 11 are, respectively, front and top views, partly in section of a preferred condenser bridge used in the circuits of Figs. 7 through 9; and Fig. 12 is a perspective view of the modification of the condenser bridge in Figs. 10 and 11.

It has been found that the conventional tube detectors used for longer radio waves cannot be efficiently used with radio waves of the order of 100 centimeters or less and these conventional tube detectors are especially impractical or impossible to use with radio waves of the order of 10 centimeters or less. The chief reason for this is that at such ultra high frequencies, the transient time of electrons between electrodes becomes comparable to the time of one period of the oscillation and, accordingly, the conventional tube does not operate fast enough to suitably perform its detecting operation.

I have designed special types of detectors for these ultra short waves and especially for the waves of the order of 10 centimeters or less and have also invented a detector circuit and modifications thereof for use with these short wave detectors. In general, I prefer to have a cathode, grid and one or more, preferably two, plate electrodes in the detector tube with the grid operating at a high positive potential with respect to the filament and the plate at a low positive or zero or negative potential. I believe that the explanation for the detection function of this type is that the high positive potential on the grid will draw the electrons through the meshes or openings in the grid towards the one or more plate electrodes. These electrons will pass through the meshes of the grid due to their inertia but the potential on the plate or plate electrodes will not be sufficient to draw these electrons completely thereto. These electrons will create a space charge condition between the grid and plate. In fact, I believe that these electrons will approach within a certain distance of the plate electrode and then return to the grid, with the result that a virtual cathode is formed very near the plate. The rectification or detection is supposed to take place between this virtual cathode and the plate and these two act as a diode of very close spacing.

In Figs. 1 and 2, I have disclosed a preferred type of detector tube for use with these ultra short waves. The tube has the vacuum-tight envelope 20 preferably much smaller than the usual detector tube. This tube has two presses 21 and 22 at opposite ends of the tube. These presses are somewhat flat and at right angles to one another. Through the upper press 22 extend two parallel wires 23 and 24 to the plate electrodes 25 and 26. These plate electrodes are symmetrical with respect to their adjacent surfaces and these adjacent surfaces 27 and 28 are preferably symmetrical with respect to a common axis. The press 21 supports the filament leads 29 and 30 therethrough, extending to a cathode structure comprising these leads bent out at 31 and 32 to provide a support for the filament proper 33 extending along the common axis of the adjacent symmetrical surfaces 27 and 28 of the plate electrodes. A grid connection 34 likewise extends through the press 21 and supports a grid structure 35 whose turns are likewise symmetrical with the filament 33 and are interposed between this filament and the two plate electrodes. The connections 29, 30 and 34 are parallel to each other wherever they approach within close proximity to one another.

Figs. 3 and 4 disclose a modification of the structure in Figs. 1 and 2. The two presses 21' and 22' are disclosed as somewhat flat and parallel to each other at opposite ends of the tube. The cathode and grid structure are the same as that in Figs. 1 and 2. The two anodes 36 and 37 are placed side by side along the axis of the cathode 33 instead of facing one another. The inner surfaces of these anodes 36 and 37 are equally spaced throughout from the cathode filament 33 as disclosed in Fig. 4. These plates may take the form of cylinders or a portion of the cylinder in case the complete cylinder is not convenient to assemble in the tube. The parallel arrangement of the connections to the electrodes is continued as explained in connection with Figs. 1 and 2.

The modification disclosed in Figs. 5 and 6 is somewhat similar to that in Figs. 3 and 4, except that only one plate electrode 38 is used instead of the two plate electrodes 36 and 37.

In general, these tubes and electrodes are small. The size of the tube in Fig. 1, for example, may be three and one-half inches long by one inch in diameter. The spacing between the parallel plate connections 23 and 24 is $\frac{5}{16}$ of an inch and the wires themselves of .04" diameter. The plate electrodes themselves may be of graphite with their inner adjacent surfaces an arc formed as the boundary of a .2" diameter hole. The filament may be of .004" tungsten about one-half an inch long and the grid and cathode connections of .02 inch diameter. The grid proper may be of seven turns of .005 inch molybdenum wire forming a cylindrical shape of .06 inch diameter by about one-fourth of an inch in length. In Figs. 3 and 4, the plate electrodes 36 and 37 may be of .005 inch molybdenum plate material bent into an arc of .2 inch diameter. It will be noted that wherever possible the arrangement of the elements of the tube have been made symmetrical.

In Figs. 7, 8 and 9, I have disclosed a diagram of a circuit and a modification thereof which I have invented to use with the detector tubes described in Figs. 1 through 4. In Fig. 7, the detector tube 20 is disclosed which may be that of either Figs. 1 and 2 or 3 and 4 or a modification thereof. For the sake of clearness, I am using the same designation of elements therein as used in Figs. 1 and 2. The parts of this tube, previously described, are the plate elements 25 and 26, the grid 35, and cathode filament 33, parallel plate connections 23 and 24, parallel cathode connections 29 and 30 and the grid connection 34.

The input circuit of this detector circuit preferably comprises a dipole antenna 40 with its two poles 41 and 42. This dipole antenna is preferably placed in the focus of a large parabolic reflecting surface in order that the ultra short waves may be impressed thereon in suitable quantity. Such a reflecting surface has been described in my case entitled "Magneto-static oscillator with internal oscillating circuit" previously referred to. The antenna has one of its poles 41 connected by conductor 43 to the grid connection 34 of the tube 20 and the pole 42 is connected by conductor 44 to one of the cathode leads 29. These connections 43 and 44 are parallel and have inserted therein an adjustable Lecher arrangement 45 comprising two cylinders 46 and 47 surrounding the connections 43 and 44 and the connections 29 and 34 in close frictional fit and yet loose enough to permit the adjustment of the end of the antenna 40 to be placed at a predetermined effective distance from the electrode structure of the tube. This effective distance is substantially equal to a multiple of half the wave length of the waves that are to be detected by the circuit.

The high potential applied to the grid circuit is supplied from a source of potential 50 passing through a suitable choke coil 51 to the grid connection 34. This connection is made most convenient by a connection 52 attached to the Lecher cylinder 46. It is desired to prevent the radio frequencies from passing down the connection 52 and having any portion thereof dissipated in the direct current circuit involved in the connections 53 to the receiver or amplifier. Accordingly, a wire 54 is connected also to the Lecher cylinder 47 and extends parallel with the connection 52. At a quarter wave length of the waves to be detected from the input circuit, is placed a condenser bridge 56. This condenser bridge at the particular effective quarter wave length distance will reflect back the radio frequency wave to the input circuit and will thus prevent its dissipation or any portion thereof in the direct current circuit. The radio frequency waves have a node or zero potential at these points and hence the waves are readily stopped and reflected back by the bridge. "Quarter wave length points" is a phrase used to briefly designate these places having a node or zero potential in a radio frequency wave.

A preferred type of condenser bridge is illustrated in Figs. 10 and 11. Two wires 57 and 58 pass through two metal blocks 59 and 60 in frictional sliding contact therewith. Between these two metal blocks or conductors is a very thin layer 61 of insulation that forms the condenser with these two blocks. Surrounding certain sides of the two blocks is also other insulation 62 contained in a U-shaped support 63 having a screw 64 adapted to exert pressure upon the two blocks and hold them in a fixed position once the proper distance along the two wires 57 and 58 is determined.

Fig. 12 discloses a modification of this condenser bridge in which a conductor plate 65 is insulated from the two wires 66 and 67 by glass sleeves 68 and 69. These glass sleeves permit the condenser bridge to be moved along to the desired position.

Returning now to Fig. 7, the incoming signal must also be prevented from dissipating into the filament circuit inasmuch as the antenna is connected to one of the filament leads 29. To prevent this dissipation, a similar condenser bridge is placed in the filament leads. It will be noted that the two filament connecting wires 70 and 71 extend parallel to each other. At a quarter wave length position 72 from the input circuit a condenser bridge 73 is located to reflect back any radio frequency wave passing up the connection 70. Suitable choke coils 74, 75, resistance 76, and a source of potential 77 are placed in the cathode circuit.

In order to have a symmetrical connection with the two anodes 25 and 26, a bridge 80 is placed across the two connections 23 and 24 and a single lead 81 is connected with this bridge. This bridge is preferably placed at a distance of a quarter wave length or at voltage node from the plates. This shorting bridge is made adjustable so that it can slide along the two connections 23 and 24 to the desired distance. The connection 81 is adjusted to the resistance 82 across the battery 77 in order to put the desired potential upon the plates. As previously mentioned, this potential can be a very low positive or negative potential but I prefer to make it a zero potential.

Fig. 8 discloses a modification of the circuit in Fig. 7 in which the input circuit is connected to the two cathode connections 29 and 30 instead of one of the cathode connections and the grid connections. In other respects, substantially the same arrangement is used as in Fig. 7 except for necessary modifications.

In Fig. 9, I have disclosed a still further modification in which the input circuit is connected to the two plate electrodes 25 and 26. The adjustable Lecher bridge 45 is used to adjust the proper length of the input circuit and the shorting bridge 80 with the single lead 81 extending symmetrically therefrom, is similar to that of Figs. 7 and 8 except for their position. The single lead 81 is preferably attached to the midpoint of the potentiometer 82' across the two cathode leads 30 and 31'. Condenser bridges 73 and 56' are used between the two cathode leads and one of the cathode leads in the grid lead, similar to that in Fig. 7.

An examination of the figures of the drawings will disclose that I have invented a novel method of supplying the signal voltage to the electrodes of the short wave detector and various modifications thereof. It will be noted that the parts of both the detector and the detector circuit are symmetrically arranged. Stray capacities and stray couplings are eliminated throughout the design. Certain modifications can be made, of course, with the various circuits described. If, for instance, a tube with one plate such as disclosed in Figs. 5 and 6 is to be used in the circuit then there would be only one connection through a choke coil to this plate 38 instead of the two connections 23 and 24 illustrated in the circuit diagram. As an example of certain operating conditions for the circuits illustrated in Figs. 7 and 8, the following characteristics are given: Grid voltage + 180 volts; grid current 10 m. a., plate voltage 0 (referred to negative end of filament) and plate current about .2 m. a. The output under proper conditions is at least twice that of a very sensitive galena crystal and is generally ten times that of the average crystal that had to be used with these very short wave lengths heretofore.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a detector circuit for short waves, a vacuum tube having two plate electrodes, a grid and an electron-emissive cathode, two parallel connected conductors to said respective plate electrodes, a short-circuit for said short waves bridging said two conductors, two parallel conductors respectively connected to said grid and said cathode, a signal input circuit connected to two of said parallel conductors, a short-circuit for short waves bridging said input circuit, and a source of voltage, a choke coil and an energy-translating device interconnecting said short-circuits.

2. In a detector circuit for short waves, a vacuum tube having two plate electrodes, a grid and an electron-emissive cathode, two parallel conductors connected to said respective plate electrodes, a short-circuit for short waves bridging said two conductors, two parallel conductors connected to said cathode, a conductor connected to said grid parallel with the last-mentioned conductors, a capacitance across said parallel conductors to said cathode, a capacitance bridged between said grid conductor and one of said cathode conductors, a signal input circuit connected to two of said parallel conductors, and a source of voltage, a choke coil and an energy-translating device connected between said capacitances.

3. In a detector circuit for short waves, a vacuum tube having two plate electrodes, a grid and an electron-emissive cathode, two parallel conductors connected to said respective plate electrodes, a short-circuit for short waves symmetrically bridging said two conductors, two parallel conductors connected to said cathode, a conductor connected to said grid parallel with the last-mentioned conductors, a short-circuit for said short waves bridging said parallel conductors to said cathode, a short-circuit for said short waves bridged between said grid conductor and one of said cathode conductors, a signal input circuit connected to two of said parallel conductors, one of said short-circuits bridging said input circuit, and a source of voltage, a choke coil and an energy-translating device interconnecting said short-circuits, said short-circuits bridging their respective conductors at quarter-wave points thereon.

4. In a detector circuit for short waves, a vacuum tube containing an electron-emissive electrode together with a cold electrode spaced therefrom and a second cold electrode interposed between the aforesaid electrodes, a source of voltage together with a choke coil and an energy-translating device connected in circuit between said electron-emissive electrode and said interposed electrode, and a signal-input circuit for said short waves connected across the terminals of said electron-emissive electrode.

5. In a detector circuit for short waves, a vacuum tube containing an electron-emissive electrode together with a pair of cold electrodes and another cold electrode interposed between said electron-emissive electrode and said pair of cold electrodes, a linearly-extended conductive path interconnecting said pair of cold electrodes with each other, a source of voltage together with a choke coil and an energy-translating device connected between said electron-emissive electrode and said interposed electrode, and a signal-input circuit for said short waves connected between a pair of the aforesaid electrodes.

6. In a detector circuit for short waves, a vacuum tube containing an electron-emissive electrode together with a cold electrode spaced therefrom and a second cold electrode interposed between the two first-mentioned electrodes, a pair of substantially parallel conductors connected respectively to the ends of said electron-emissive electrode, a short-circuit for short waves bridging said pair, two substantially parallel conductors connected respectively to the above-mentioned two cold electrodes, a short-circuit for short waves bridged between one of said conductors to the cathode and one of said other parallel conductors, a source of voltage together with a choke coil and an energy-translating device interconnecting said electron-emissive electrode and said interposed electrode, and a signal-input circuit for said short waves interconnecting one of said parallel conductors with another of said parallel conductors.

7. In a detector circuit for short waves, a vacuum tube containing an electron-emissive electrode, a cold electrode spaced therefrom and a second cold electrode interposed between the two first-mentioned electrodes, a pair of substantially parallel conductors connected respectively to the ends of said electron-emissive electrode, a short-circuit for short waves bridging said pair at quarter-wave points thereon, two substantially parallel conductors connected respectively to the above-mentioned two cold electrodes, a short-circuit for short waves bridged between one of said conductors to the cathode and one of said other parallel conductors at quarter-wave points thereon, a source of voltage together with a choke coil and an energy-translating device interconnecting said electron-emissive electrode and said interposed electrode, and a signal-input circuit for said short waves interconnecting one of said parallel conductors with another of said parallel conductors.

8. In a detector circuit for short waves, a vacuum tube containing an electron-emissive electrode, a cold electrode spaced therefrom and a second cold electrode interposed between the two first-mentioned electrodes, a pair of substantially parallel conductors connected respectively to the ends of said electron-emissive electrode, a short-circuit for short waves bridging said pair at quarter-wave points thereon, two substantially parallel conductors connected respectively to the above-mentioned two cold electrodes, a short-circuit for short waves bridged between one of said conductors to the cathode and one of said other parallel conductors at quarter-wave points thereon, a source of voltage together with a choke coil and an energy-translating device interconnecting the first-mentioned bridging point and said interposed electrode, and a signal-input circuit for said short waves interconnecting one of said parallel conductors with another of said parallel conductors.

GEORGE R. KILGORE.